United States Patent Office 3,816,475
Patented June 11, 1974

---

3,816,475
COLOR STABILIZER FOR MALEIC ANHYDRIDE
Jesse Wehrman, Houston, Tex., assignor to Petro-Tex
Chemical Corporation, Houston, Tex.
No Drawing. Continuation-in-part of application Ser. No. 852,088, Aug. 21, 1969, now Patent No. 3,636,057. This application July 15, 1971, Ser. No. 163,040.
The portion of the term of the patent subsequent to Jan. 18, 1989, has been disclaimed
Int. Cl. C07c 57/14
U.S. Cl. 260—346.8                       11 Claims

ABSTRACT OF THE DISCLOSURE

High temperature color stable maleic anhydride can be obtained by adding trace amounts, i.e., 50-2000 p.p.m. of thiophosphorus compounds of the structure

where Q is X or RD, X is F, Cl, Br or I, D is O or S and R is hydrogen or any organic radical providing a compound soluble in maleic anhydride and having substantially no chromophoric properties and the acid salts thereof. For example, maleic anhydride containing 500 p.p.m. of thiophosphate trihalide maintained at 140° for 24 hours has a color of less than 50 (Hazen) whereas unstabilized maleic anhydride had a color of 300+ (Hazen).

---

This application is a continuation-in-part of U.S. application Ser. No. 852,088, filed Aug. 21, 1969, now U.S. Pat. 3,636,057.

This application relates to maleic anhydride which is color stabilized for high temperature uses with a thiophosphorus compound.

Maleic anhydride is a widely used chemical intermediate. It is used in the preparation of a wide variety of polyester resins for molding and coating. Maleic anhydride has been a traditional Diels-Alder reactant. Maleic anhydride addition to conjugated dienes by the Diels-Alder mechanism and substitution addition reactions with olefin containing reactant provides increased functionality of polymeric coating compositions such as those prepared for such long chain fatty acids as tall oil, cottonseed fatty acid, linseed oil, rosin and the like. Maleic adducts of polymerized resinous systems, esterified and sulfonated find use as wetting and sudsing agents. Maleic anhydride is an epoxy curing agent.

In many of the utilities in which maleic anhydride is employed it is subjected to high temperatures and without stabilization it can discolor. Although in some applications the discoloration is no problem, in many others it is a considerable drawback to the use of a maleic anhydride, for example, in clear coating or moldings which are heat cured. Color stability is also important since maleic anhydride is often shipped and stored in a molten state usually at temperatures of 60 to 80° C. Moreover, careless handling can result in excess temperatures, i.e., 150° C. or more for extended periods of time. To protect the color of the maleic anhydride under these conditions there must be a suitable stabilizer.

Since maleic anhydride is employed in a wide variety of uses because of its particular and predictable behavior on specification, any additive must not detract from these properties or have side effects which depreciate the maleic anhydride or the products prepared therefrom. This unobstrusiveness should of course be inherent in any functional material added to the maleic anhydride. However, any functional material will have a degree of contaminating effect and modification; thus, it is most desirable that the functional additive be employed in the smallest quantity possible. Preferably the additive is employed in what is described as a "trace amount." By the use of such small quantities of functional materials the integrity of the maleic anhydride is preserved.

Briefly stated, the present invention is a composition comprising maleic anhydride and a color stabilizing amount of thiophosphorus compound having the structure

where Q is X or RD, X is F, Cl, Br or I, D is O or S and R is hydrogen or any organic radical providing a compound soluble in maleic anhydride and having substantially no chromophoric properties and the acid salts thereof.

Normally, the maleic anhydride employed in the present invention will be of very high purity in order that the initial color is of a high order. Generally, the purity of the anhydride will be around 90 percent to obtain the benefits of the present invention. The present invention is particularly useful with what may be called "specification grade" maleic anhydride which is generally understood to mean purity of at least 99.5 percent. Specification grade maleic anhydride will have very good initial color e.g. 20 (Hazen) or less.

The thiophosphates of the invention are prepared by conventional methods, for example, as shown in *Phosphorus and Its Compounds*, vol. II, John R. van Wazer, Interscience Publishers, Inc., 1961, New York, pp. 1257–1262.

The Q can be a halogen of either F, Cl, Br or I. Some of the suitable halides would be thiophosphoryl chloride and thiophosphoryl bromide. The group Q can be a mixture of halides, for example, thiophosphoryl dibromo monochloride. In a similar manner the group Q can be a mixture of halides and RD group such as dithiophosphoric acid monohalide. Some other suitable color stabilizers are monothiophosphsoric acid, dithophosphoric acid, trithiophosphoric acid.

R is preferaby hydrogen or a hydrocarbon radical substituted with from 1 to 3 substituents selected from the group of carboxy, hydroxyl, carbohydrocarbyloxy, hydrocarbyloxy, halogen, cyano, amino and hydrocarbyl thio. In the structure

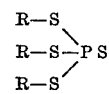

where R is hydrocarbyl the hydrocarbon radical can be any hydrocarbon radical or a combination of radicals, for example, alkyl cycloalkyl, aryl, aralkyl, alkaryl and polycycloalkyl, such as ethyl, phenyl, phenylphenyl t-butyl phenyl, benzyl, tolyl, naphthyl, cyclohexyl, cyclopentyl, cycloheptyl, bicyclo (2,2,1) heptyl, adamantyl, etc., where R is substituted hydrocarbyl the substituents will occupy from 1 to 3 positions on the hydrocarbyl radical as described above, and may be any one or a mixture of, for example, fluorine, chlorine, bromine, iodine, hydroxyl, carboxy, carbethoxy, carbomethoxy phenylbenzyloxy, biphenylyloxy, toloxy, methoxy, amino, methyl amino, dimethyl amino, ethoxy and hydrocarbyl thio. The structure

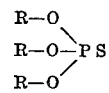

where R is hydrocarbyl of 1 to 15 carbon atoms has been described in my copending application, Ser. No. 852,088, filed Aug. 21, 1969, now U.S. Pat. 3,636,057, where R is substituted hydrocarbyl as described above, the substituents will occupy from 1 to 3 positions on the hydrocarbyl radicals and may be any one or a mixture of the substituents described above.

R can have from 1 to 30 carbon atoms. The hydrocarbon radical R will normally have 1 to 5 carbon atoms, in addition the substituents containing carbon may contain from 1 to 15 carbon atoms.

The acid salts of those compounds containing an acid group, i.e., HO or HS are also suitable. Generally the alkali, e.g., Na, K and alkaline earth e.g., Mg, Ca, salts and ammonium salts will be used.

Not only can the various Q groups vary within a particular compound but various compounds within the scope of the structure as described may be used together. The Q group may be any organic radical which is soluble in maleic anhydride but which is not itself a color body, i.e., chromophore. It has been determined that it is the thiophosphorus portion of the compound that is the stabilizer thus the identity of Q is noncritical as long as it is not detrimental to the color of the maleic anhydride and the examples herein are intended to be illustrative of the scope and not limiting thereof.

Those groups which would be excluded from Q include nitro, azo, nitroso, carbonyl and conjugated ethylenic unsaturation, for example such as nitrosophenyl, nitrophenyl,

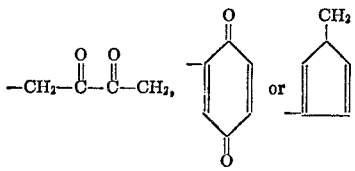

The thiophosphorus compound is added to the maleic anhydride while the anhydride is in the molten state. This is usually around 60° C. (M.P. 52.4–52.8° C.) although lower or higher temperatures can be used. The stabilizer is added directly to the molten maleic anhydride with agitation. Under these conditions the solution of the small amount of thiophosphorus compound is very rapid.

The amount of thiophosphorus employed is very small. Preferably the smallest quantity which will give acceptable color stability is employed. Substantial color stability improvement can be noted with as little as 50 p.p.m. of the stabilizer. However, more significant improvement is observed at about 100 p.p.m. to about 2000 p.p.m. at which point there is a decline in the effectiveness of the stabilizer. Preferably about 150 to 1500 p.p.m. of thiophosphate are employed and even more preferably about 300 to 1000 p.p.m. In an event the amount of thiophosphorus compound employed is such as to be insufficient to adversely effect the properties of the maleic anhydride.

After addition of the stabilizer, the maleic anhydride can be maintained in the molten state or solidified and prepared in the usual manner in the form of briquettes, flakes, powders and the like.

The benefits of the present invention are obtained when the maleic anhydride in the normal course of handling the utilization is subjected to elevated temperatures. By the phrase "elevated temperatures" is meant temperatures above the melting point of maleic anhydride, i.e., about 52.4° C. There are, however, benefits to be derived at lower temperatures; for example, from room temperature (approximately 25° C.) upward since even at these relatively low temperatures there is some color deterioration over long periods of time. The upper limit of applicability of the stabilization is the point at which the maleic anhydride undergoes decomposition or charring, generally around 180° C.

The following examples will illustrate the practice of the present invention and the benefits to be derived therefrom.

EXAMPLES 1–29

The maleic anhydride is a commercial material having the following specification:

Assay _____ 99.5 percent minimum.
Freezing point _____ 52.5° C. minimum.
Color _____ 20 Hazen maximum.
Xylene insoluble _____ None.

One hundred and thirty-five grams of maleic anhydride is placed in a test tube at 60° C. and the stabilizer added and dissolved in the amount indicated in the Table. The temperature of the molten material is then raised to 140° C. and held there for 24 hours at which time the color is determined.

The standard use to indicate the quantity or intensity of color of the products in the molten or liquid form is known as the APHA standard color test. This test is one developed by the American Public Health Association which is known as the Hazen Platinum-Cobalt Scale which is described in "Standard Methods of Chemical Analysis," Wilford W. Scott, 5th ed., p. 2048. To determine the color, a molten sample is poured into a 50 ml. tall form Nessler tube and compared with APHA color standards using a matte white background in diffused daylight.

TABLE

| Run | Stabilizer | Gram | P.p.m. | Color Hazen |
|---|---|---|---|---|
| 1 | Control | 0 | 0 | 300+ |
| 2 | Monothiophosporic acid | .0181 | 140 | <50 |
| 3 | do | .0772 | 560 | <50 |
| 4 | do | .1930 | 1,420 | <50 |
| 5 | Dithiophosphoric acid | .0181 | 140 | <50 |
| 6 | do | .0772 | 560 | <50 |
| 7 | do | .1930 | 1,420 | <50 |
| 8 | Trithiophosphoric acid | .0811 | 140 | <50 |
| 9 | do | .2316 | 1,720 | <50 |
| 10 | (C₂H₅)₂PSCl | .0181 | 140 | <50 |
| 11 | (C₂H₅O)₂PSCl | .1554 | 1,120 | <50 |
| 12 | PSCl₃ | .0181 | 140 | <50 |
| 13 | PSCl₃ | .0772 | 560 | <50 |
| 14 | PSCl₃ | .1930 | 1,420 | <50 |
| 15 | (CH₃O)₂PSCl | .0772 | 560 | <50 |
| 16 | Tris (chloropropyl) thiophosphate | .0181 | 140 | <50 |
| 17 | do | .0772 | 560 | <50 |
| 18 | do | .1930 | 1,420 | <50 |
| 19 | Dimethyl dithiophosphate | .0181 | 140 | <50 |
| 20 | do | .0772 | 560 | <50 |
| 21 | Diethyl dithiophosphate | .0772 | 560 | <50 |
| 22 | do | .2316 | 1,720 | <50 |
| 23 | Na (di-sec-butyl) dithiophosphate | .0181 | 140 | <50 |
| 24 | do | .0772 | 560 | <50 |
| 25 | NH₃ (dicresyldithiophsphate) | .0772 | 560 | <50 |
| 26 | Ba (bis(p-tert-amylphenyl) dithiophosphate) | .0772 | 560 | <50 |
| 27 | Ba (di(hexyl/octyl)dithiophosphate) | .0772 | 560 | <50 |
| 28 | C₂H₅SCH₂SP(S)(OC₂H₅)₂ | .0181 | 140 | <50 |
| 29 | C₂H₅SCH₂SP(S)(OC₂H₅)₂ | .1930 | 1,420 | <50 |

The invention claimed is:

1. A composition consisting essentially of maleic anhydride and a small color stabilizing amount of a thiophosphorus compound soluble in said maleic anhydride said compound having the structure

where Q is X or RD, X is F, Cl, Br or I, D is O or S and R is hydrogen, hydrocarbyl having from 1 to 30 carbon atoms or substituted hydrocarbyl having from 1 to 30 total carbon atoms substituted with from 1 to 3 substituents selected from the group consisting of carboxy, hydroxyl, carbohydrocarbyloxy, hydrocarbyloxy, halogen, cyano, amino and hydrocarbylthio, and having substantially no chromophoric properties and the acid salt thereof, provided, when Q is RD at least one D is O and providing at least one Q is other than hydrocarbyloxy.

2. The composition according to claim 1 wherein there is at least 50 parts per million of the thiophosphorus compound.

3. The composition according to claim 2 wherein there is 150 to 1500 parts per million of the thiophosphorus compound.

4. The composition according to claim 3 wherein there is 300 to 1000 parts per million of the thiophosphorus compound.

5. The composition according to claim 2 wherein Q is RD.

6. The composition according to claim 5 wherein R is hydrogen or hydrocarbyl having from 1 to 3 carbon atoms.

7. The composition according to claim 2 wherein Q is X.

8. The compoition according to claim 7 wherein X is Cl.

9. The composition according to claim 1 wherein there is at least 90 percent maleic anhydride.

10. The composition according to claim 9 wherein there is at least 99.5 percent maleic anhydride.

11. The composition according to claim 5 wherein R is substituted hydrocarbyl having from 1 to 30 total carbon atoms substituted from from 1 to 3 substituents selected from the group consisting of carboxy, hydroxyl, carbohydrocarbyloxy, hydrocarbyloxy, halogen, cyano, amino and hydrocarbylthio.

References Cited
UNITED STATES PATENTS 3,636,057   1/1972   Wehrman _____ 260—346.8 M HENRY R. JILES, Primary Examiner B. DENTZ, Assistant Examiner

PO-1050
(5/69)

UNITED STATES PATENT OFFICE
CERTIFICATE OF CORRECTION

Patent No. 3,816,475                    Dated June 11, 1974

Inventor(s) Jesse Wehrman

It is certified that error appears in the above-identified patent and that said Letters Patent are hereby corrected as shown below:

Col. 1, line 61 reads "excess" but should read --- excessive ---.
Col. 2, line 41 reads "dithophosphoric" but should read --- dithiophosphoric ---.
Col. 3, line 7 reads "1 to 5" but should read --- 1 to 15 ---.
Col. 3, lines 2 - 25 reads "  " but should read ---  ---.

Col. 3, lines 30 - 35 read
$$\begin{matrix} & O & O & \\ CH_2 & C & C & CH_2 \end{matrix}$$ but should read --- $$\begin{matrix} & O & O & \\ CH_2 & C & C & CH_3 \end{matrix}$$ ---.

Col. 4, lines 30 - 34 (Table) reads ".0811" but should read --- .0181 ---.
Col. 4, line 36 reads "$(C_2H_5)_2PSCl$" but should read --- $(C_2H_5O)_2PSCl$ ---.
Col. 6, line 5 reads "from from" but should read --- with from ---.

Col. 2, line 64, "biphenylyloxy" should read -- biphenyloxy --.
Col. 4, line 30 (TABLE) "Monothiophosporic" should read -- Monothiophosphoric --.

Signed and sealed this 15th day of April 1975.

(SEAL)
Attest:

RUTH C. MASON
Attesting Officer

C. MARSHALL DANN
Commissioner of Patents
and Trademarks